W. C. HOOKER.
Animal-Trap.

No. 218,532. Patented Aug. 12, 1879.

UNITED STATES PATENT OFFICE.

WILLIAM C. HOOKER, OF ABINGDON, ILLINOIS.

IMPROVEMENT IN ANIMAL-TRAPS.

Specification forming part of Letters Patent No. 218,532, dated August 12, 1879; application filed March 6, 1879.

*To all whom it may concern:*

Be it known that I, WILLIAM C. HOOKER, of Abingdon, in the county of Knox and State of Illinois, have invented a new and useful Improvement in Animal-Traps, of which the following is a specification.

My invention relates to a trap for catching small animals, such as rats, gophers, and minks, by setting the trap in the holes and runways frequented by such animals; but it may also be used for larger animals by making it of suitable dimensions.

The invention consists in combining a wire shaped to form a loop, spur, spring, and bow with a trigger having an abutment and an extension up into the bow, as hereinafter described.

Figure 1:
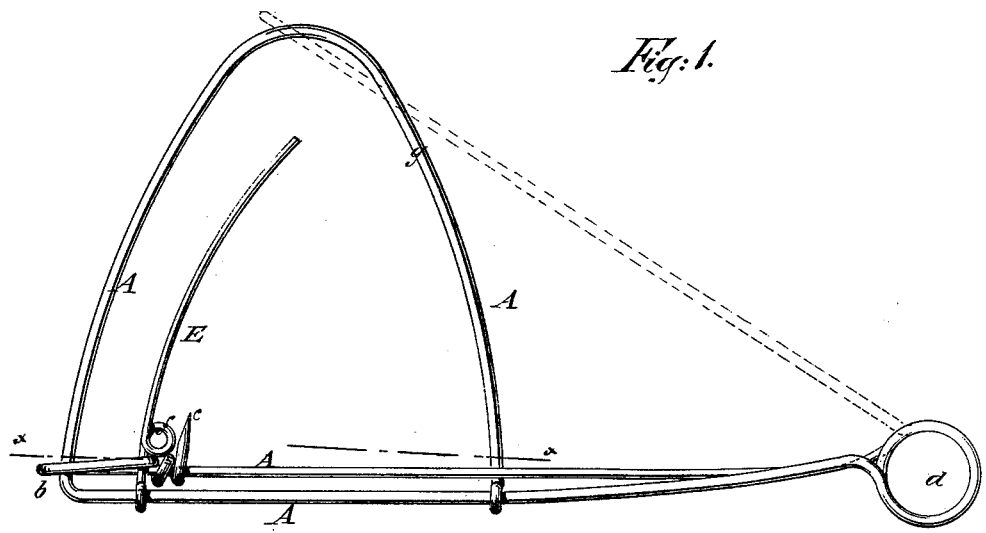
Figure 2:
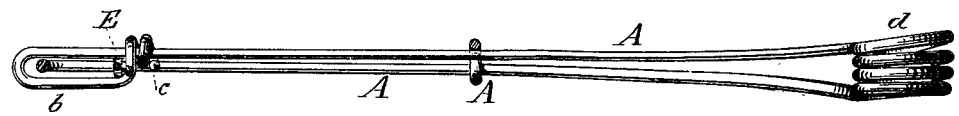

The accompanying drawings represent a trap constructed according to my invention, Figure 1 being a side view, and Fig. 2 an edge view, partly in section.

Similar letters of reference indicate corresponding parts.

The trap proper is made of a single piece of wire, A, one end of which is bent to form a loop or eye, $b$, and then twisted once or more around the main portion and sharpened to form a spur, $c$. At a suitable distance from this loop and spur the wire is coiled a number of times, forming a spring, $d$, and thence extends in a straight line for a distance from said spring nearly equal to the distance of the eye $b$ therefrom. The wire is then bent at about a right angle and is passed through the loop or eye $b$, and is still further bent to form a bow, $g$. The extreme end of the wire is then secured by twisting it around the straight portion between the spring $d$ and the point where it is bent to pass through the loop $b$.

The trigger consists of a piece of wire, E, having one end twisted around the wire A near the point where it is bent to pass through the loop. Near said point of attachment of the trigger it is bent to form a projection or abutment, $f$. The trigger extends a suitable distance toward the middle of the bow to allow the animal to press on the end of said trigger.

To set the trap, the trigger E is passed through the loop or eye $b$, and the two portions of the wire A, which radiate from the spring $d$, are pressed toward each other until the abutment $f$ has passed through the loop $b$. The trigger is then moved so as to cause the abutment $f$ to engage with the extremity of the eye $b$ nearest the spur $c$ and hold the parts in the position shown in full lines. The trap is then placed with the bow in the hole or runway frequented by the animal which it is desired to catch.

As the animal passes through the bow the trigger is disengaged from the loop, so as to release the portion of the wire which carries the spur and cause it to spring outward to the position shown in dotted lines and impale the animal on the spur $c$.

Having thus described my invention, I claim as new and desire to secure by Letters Patent—

In an animal-trap, the wire A, having loop $b$, spur $c$, spring $d$, and bow $g$, in combination with a trigger, E, bent around wire, forming an abutment, $f$, and extending up into the bow $g$, as shown and described.

WILLIAM C. HOOKER.

Witnesses:
H. C. MURPHY, Jr.,
C. S. HUBBELL.